(12) United States Patent
Keating

(10) Patent No.: US 10,995,707 B1
(45) Date of Patent: May 4, 2021

(54) INTAKE AIR HEATING WITH PRE-CHAMBER IGNITION IN A GASOLINE ENGINE

(71) Applicant: GM Global Technology Operations LLC, Detroit, MI (US)

(72) Inventor: Edward J Keating, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/718,291

(22) Filed: Dec. 18, 2019

(51) Int. Cl.
*F02G 5/00* (2006.01)
*F02M 31/13* (2006.01)
*F02B 29/04* (2006.01)
*F02M 35/10* (2006.01)

(52) U.S. Cl.
CPC ......... *F02M 31/13* (2013.01); *F02B 29/0493* (2013.01); *F02M 35/10268* (2013.01)

(58) Field of Classification Search
CPC ......... F02B 19/12; F02B 19/18; F02M 31/13; F02P 13/00; F02P 9/007
USPC ........................................................ 123/556
See application file for complete search history.

(56) References Cited

U.S. PATENT DOCUMENTS

| 2,320,528 | A | * | 6/1943 | Loeffler | F02M 1/00 219/551 |
|---|---|---|---|---|---|
| 6,031,204 | A | * | 2/2000 | Prust | F02M 31/13 123/549 |
| 7,406,957 | B2 | * | 8/2008 | Betcher | F02M 31/13 123/549 |
| 7,464,699 | B2 | * | 12/2008 | Joppig | F02M 31/135 123/556 |
| 7,487,765 | B1 | * | 2/2009 | Kohrt | F02M 31/13 123/549 |
| 8,631,642 | B2 | * | 1/2014 | Carlill | F01N 3/0235 60/285 |
| 9,151,196 | B2 | * | 10/2015 | Vigild | F02M 31/02 |
| 2002/0096155 | A1 | * | 7/2002 | Thimmesch | F02M 31/135 123/543 |
| 2006/0196484 | A1 | * | 9/2006 | Gill | F02M 31/13 123/549 |
| 2008/0202461 | A1 | * | 8/2008 | Rankin | B23P 19/043 123/142.5 R |
| 2012/0291760 | A1 | * | 11/2012 | Vigild | F02M 35/112 123/542 |

(Continued)

*Primary Examiner* — Long T Tran
*Assistant Examiner* — James J Kim

(57) ABSTRACT

An internal combustion gasoline engine includes an air heater coupled to an intake duct of the engine in a heat transfer relationship with air in the intake duct. A combustion pre-chamber is also formed in the head of the engine. The pre-chamber is at least partially separated from the combustion chamber by a wall. One or more apertures are formed through the wall and provide fluid communication paths from the combustion chamber to the pre-chamber, feeding a mixture of air and fuel from the combustion chamber to the pre-chamber. The apertures further define a plurality of combustion paths allowing ignited fuel and air from the pre-chamber to efficiently enter and combust the fuel and air mixture within the combustion chamber. The air heater and the combustion pre-chamber increase combustion efficiency from a first efficiency level to a second efficiency level greater than the first efficiency level.

20 Claims, 4 Drawing Sheets

(56) References Cited

U.S. PATENT DOCUMENTS

| | | | |
|---|---|---|---|
| 2016/0160738 A1* | 6/2016 | Na ....................... | F02M 31/105 |
| | | | 123/41.08 |
| 2017/0284320 A1* | 10/2017 | Holst ...................... | F02D 37/02 |
| 2017/0342882 A1* | 11/2017 | Kim ........................ | F01N 3/027 |
| 2018/0294626 A1* | 10/2018 | Niessner ............. | F02B 19/1004 |
| 2018/0313292 A1* | 11/2018 | Manju .................. | F02B 23/101 |
| 2019/0323415 A1* | 10/2019 | Corrigan ............... | F01N 3/2006 |

\* cited by examiner

INTAKE AIR HEATING WITH PRE-CHAMBER IGNITION IN A GASOLINE ENGINE

INTRODUCTION

The present disclosure relates to motor vehicles and more specifically to cold-start operations an internal combustion gasoline engine of a motor vehicle.

Motor vehicles are used throughout the world in a variety of climates. In some locations, ambient temperatures can remain significantly below 40° F. throughout significant portions of the day for months at a time. In fact, some areas can remain well below 0° F. for similar stretches of time. Typical motor vehicle engines are capable of starting using a mixture of fuel and ambient air in such low temperatures depending on engine size, compression ratio, spark intensity, battery charge, and the like.

However, as ambient temperatures decrease, the temperature within the combustion chamber of an internal combustion engine may not be high enough to ensure proper ignition of the injected fuel. The resulting ineffectual or incomplete combustion can result in increased emissions, decreased efficiency, and reduced catalytic converter lifespan in particularly frigid environs.

In some cases, engine controller calibrations are designed to account for low ambient temperatures and to alter combustion characteristics to improve catalyst light-off speed and improve combustion efficiency and cleanliness. In some instances, block heaters may be used to increase the temperature of the block and/or combustion chamber of the internal combustion engine. However, block heaters draw energy from the on-board power systems of the vehicle, from external power supplies, or both. Additionally, block heaters often require aftermarket or after sale fitment to the motor vehicle and increase the complexity of the motor vehicle's electrical system.

Accordingly, while current low ambient temperature starting systems and methods for automotive internal combustion engines achieve their intended purpose, there is a need in the art for improved starting systems and methods that increase engine and catalyst warm-up rates and reduce emissions, while maintaining or reducing engine and/or electrical system complexity.

SUMMARY

According to several aspects of the present disclosure, an internal combustion engine with an intake air heater for a motor vehicle, the internal combustion engine includes a head defining a portion of a combustion chamber. The engine further includes an air intake duct feeding fresh air into the combustion chamber through at least one intake port, the intake port formed through the head. At least one fuel injector is disposed in the head and is selectively activated to supply fuel to the combustion chamber. A pre-chamber is formed in the head. The pre-chamber is at least partially separated from the combustion chamber by a wall. One or more apertures are formed through the wall. The one or more apertures provide fluid communication paths from the combustion chamber to the pre-chamber and feeding a mixture of air and fuel from the combustion chamber to the pre-chamber. An air heater is coupled to the intake duct and positioned in a heat transfer relationship with air in the intake duct. The one or more apertures further define a plurality of combustion paths allowing an ignited fuel and air mixture from the pre-chamber to efficiently enter and combust the fuel and air mixture within the combustion chamber. The selective activation of the air heater in support of the combustion pre-chamber increases combustion efficiency from a first efficiency level to a second efficiency level greater than the first efficiency level.

In another aspect of the present disclosure the internal combustion gasoline engine further includes an engine block defining at least one cylinder, the cylinder having a longitudinal axis. A piston is mounted within the cylinder and slides along the longitudinal axis within the cylinder. The piston defines, with the cylinder and the head, the combustion chamber of the engine. At least one intake valve is disposed in the head and acting on the intake port and controlling an amount of air entering the combustion chamber. At least one sensor detects a temperature of the air in the intake duct, an engine coolant temperature, or a temperature and chemical composition of exhaust gasses in an exhaust duct. The exhaust duct communicates with the combustion chamber through at least one exhaust port, the exhaust duct formed through the head and extracting exhaust gasses from the cylinder. The exhaust gasses are formed at the end or conclusion of a combustion reaction of the air and the fuel. At least one exhaust valve acts on the exhaust port and controls an amount of exhaust gas departing the combustion chamber through the exhaust port. An energizing apparatus provides electrical energy to the air heater. The air heater converts the electrical energy into thermal energy and transfers the thermal energy to the air in the intake duct to preheat the air prior to the air entering the combustion chamber. A spark plug is mounted on the head within the pre-chamber and acts inside the pre-chamber to cyclically and selectively ignite the fuel and air mixture present in the pre-chamber to initiate the combustion reaction. A control module is in electronic communication with the air heater, the energizing apparatus, the spark plug, and the at least one sensor, the control module having a memory for storing control logic, a processor for executing the control logic, and a plurality of input/output ports for receiving data from the at least one sensor, the air heater, and the energizing apparatus, and for transmitting instructions to the air heater, the energizing apparatus, and the spark plug. The control module executes control logic to preheat the air in the intake duct by engaging the air heater to pre-heat air entering the combustion chamber to increase combustion efficiency of the combustion of the air and fuel mixture within the combustion chamber from the first efficiency level to the second efficiency level.

In another aspect of the present disclosure the air heater further includes a heating element and a support structure. The heating element is disposed in the intake duct, and the support structure supports the heating element and positions the heating element in contact with the air in the intake duct.

In yet another aspect of the present disclosure the heating element includes a plurality of 180-degree bends and a plurality of planar portions positioned between the 180-degree bends. The support structure further includes a plurality of flange portions positioned adjacent the plurality of planar portions, wherein the planar portions are spaced apart from and positioned substantially parallel to one another.

In still another aspect of the present disclosure the heating element defines a cartridge disposed in the intake duct within the head of the engine and adjacent to the combustion chamber, the cartridge having a portion formed of thermally conductive material.

In still another aspect of the present disclosure the heating element includes an intake port liner. The intake port liner is shaped to be received by the intake port and including an air passage portion allowing air to flow through the intake port liner and into the combustion chamber. At least a portion of the intake port liner defines the heating element. The heating element is formed of thermally conductive material.

In still another aspect of the present disclosure the heating element includes a thermally conductive molded component, the thermally conductive molded component disposed in an intake manifold of the engine.

In still another aspect of the present disclosure the pre-chamber is only fed with the mixture of fuel and air present in the combustion chamber during movement of the piston towards the head.

In still another aspect of the present disclosure the wall between the pre-chamber and the combustion chamber is convex and protrudes into the combustion chamber.

In still another aspect of the present disclosure the pre-chamber has a volume of up to about two cubic centimeters.

In still another aspect of the present disclosure the wall between the pre-chamber and the combustion chamber includes up to ten apertures.

In still another aspect of the present disclosure a method of heating intake air in an internal combustion engine of a motor vehicle includes utilizing an internal combustion engine having a head defining a portion of a combustion chamber. The engine further includes an air intake duct feeding fresh air into the combustion chamber through at least one intake port, the intake port formed through the head. At least one fuel injector is disposed in the head and is selectively activated to supply fuel to the combustion chamber. A pre-chamber is formed in the head, the pre-chamber at least partially separated from the combustion chamber by a wall. One or more apertures is formed through the wall, the one or more apertures providing fluid communication paths from the combustion chamber to the pre-chamber and feeding a mixture of air and fuel from the combustion chamber to the pre-chamber. The method further includes positioning an air heater in a heat transfer relationship with air in the intake duct of the internal combustion engine, the air heater electrically coupled to an energizing apparatus and a control module. The one or more apertures further define a plurality of combustion paths allowing an ignited fuel and air mixture from the pre-chamber to efficiently enter and combust the fuel and air mixture within the combustion chamber. The air heater and the combustion pre-chamber increase combustion efficiency from a first efficiency level to a second efficiency level greater than the first efficiency level.

In still another aspect of the present disclosure a method of heating intake air in an internal combustion engine of a motor vehicle includes sensing a temperature of the air in the intake duct with a sensor disposed in the intake duct. The method further includes selectively engaging the energizing apparatus when the control module determines that a temperature of the air in the intake duct is below a threshold temperature. The method further includes preheating the air in the intake duct by utilizing the energizing apparatus to provide electrical energy to the air heater. The air heater converts the electrical energy into thermal energy and transferring the thermal energy to the air in the intake duct before the air enters a combustion chamber of the internal combustion engine. The method further includes injecting fuel into the combustion chamber with the fuel injector, and feeding a mixture of air and fuel from the combustion chamber to a pre-chamber. The pre-chamber is formed in the head of the internal combustion engine and has a volume of up to about two cubic centimeters. The pre-chamber is at least partially separated from the combustion chamber by a wall. One or more apertures are formed through the wall. The wall between the pre-chamber and the combustion chamber is convex and protrudes into the combustion chamber. The one or more apertures provide fluid communication paths between the combustion chamber and the pre-chamber. The method further includes igniting a mixture of the fuel and the air with a spark plug, the spark plug mounted within the pre-chamber. The air and fuel mixture is efficiently combusted within the pre-chamber and the combustion chamber. The method further includes selectively de-energizing the air heater, and efficiently combusting the fuel and air mixture within the combustion chamber.

In still another aspect of the present disclosure positioning an air heater in a heat transfer relationship with air in the intake duct further includes mounting the air heater in the intake duct. The air heater includes a heating element and a support structure supporting the heating element and positioning the heating element in contact with the air in the intake duct.

In still another aspect of the present disclosure mounting the air heater in the intake duct further includes utilizing a heating element having a plurality of 180-degree bends and a plurality of planar portions positioned between the 180-degree bends. Mounting the air heater further includes utilizing the support structure to support and position the heating element in contact with the air in the intake duct, the support structure including a plurality of flange portions positioned adjacent the plurality of planar portions, wherein the planar portions are spaced apart from and positioned substantially parallel to one another.

In still another aspect of the present disclosure mounting the air heater in the intake duct further includes utilizing an air heater defining a cartridge. The cartridge is disposed in the intake duct within the head of the engine and adjacent to the combustion chamber. The cartridge has a portion formed of thermally conductive material that defines the heating element.

In still another aspect of the present disclosure mounting the air heater in the intake duct further includes mounting an intake port liner in the intake port. The intake port liner is shaped to be received by the intake port and including an air passage portion allowing air to flow through the intake port liner and into the combustion chamber. At least a portion of the intake port liner defines the heating element. The heating element is formed of thermally conductive material.

In still another aspect of the present disclosure mounting the air heater in the intake duct further includes mounting the air heater in an intake manifold of the internal combustion engine. The air heater has a thermally conductive molded component.

In still another aspect of the present disclosure feeding a mixture of air and fuel from the combustion chamber to the pre-chamber occurs when the piston moves towards the head of the internal combustion engine.

In still another aspect of the present disclosure feeding a mixture of air and fuel further includes feeding the mixture of air and fuel through the apertures in the wall between the pre-chamber and the combustion chamber, where the wall includes up to ten apertures.

In still another aspect of the present disclosure the method further includes selectively energizing the air heater to increase a temperature of the air in the intake duct from a first temperature to a second temperature greater than the first temperature when the control module determines that the temperature of the air in the intake duct is below the threshold air temperature. The method further includes de-energizing the air heater when the control module determines that the temperature of the air in the intake duct is above the threshold temperature or a temperature and constituent components of the exhaust gases are below threshold quantity values.

In still another aspect of the present disclosure an internal combustion engine with an intake air heater for a motor vehicle includes an engine block defining at least one cylinder, the cylinder having a longitudinal axis. The engine further includes a head mounted to the engine block and defining an axial end of the cylinder, and a piston mounted within the cylinder and sliding along the longitudinal axis within the cylinder, the piston defining, with the cylinder and the head, a combustion chamber of the engine. The engine further includes an air intake duct feeding fresh air into the combustion chamber through at least one intake port, the intake port formed through the head. At least one intake valve is disposed in the head and acts on the intake port and controlling an amount of air entering the combustion chamber. At least one fuel injector is disposed in the head and is selectively activated to supply fuel to the combustion chamber. At least one sensor is disposed in the intake duct and in an exhaust duct. The at least one sensor detects a temperature of the air in the intake duct, engine coolant temperature, or a temperature or chemical composition of exhaust gasses in an exhaust duct. The exhaust duct communicates with the combustion chamber through at least one exhaust port. The exhaust duct is formed through the head and extracts exhaust gasses from the cylinder, the exhaust gasses are formed at the end or conclusion of a combustion reaction of the air and the fuel. At least one exhaust valve acts on the exhaust port and controls an amount of exhaust gas departing the combustion chamber through the exhaust port. A pre-chamber is formed in the head. The pre-chamber is at least partially separated from the combustion chamber by a wall. The wall between the pre-chamber and the combustion chamber is convex and protrudes into the combustion chamber. One or more apertures are formed through the wall. The one or more apertures provide fluid communication paths from the combustion chamber to the pre-chamber and feed a mixture of air and fuel from the combustion chamber to the pre-chamber. The pre-chamber is fed with the mixture of fuel and air present in the combustion chamber during movement of the piston towards the head. An air heater has a heating element and a support structure supporting the heating element and positioning the heating element in a heat transfer relationship with the air in the intake duct. An energizing apparatus provides electrical energy to the air heater. The air heater converts the electrical energy into thermal energy and transfers the thermal energy to the air in the intake duct to preheat the air prior to the air entering the combustion chamber. A spark plug is mounted on the head within the pre-chamber and acts inside the pre-chamber for cyclically and selectively igniting the fuel and air mixture present in the pre-chamber and for initiating the combustion reaction. A control module is in electronic communication with the air heater, the energizing apparatus, the spark plug, and the at least one sensor, the control module having a memory for storing control logic, a processor for executing the control logic, and a plurality of input/output ports for receiving data from the at least one sensor, the air heater, and the energizing apparatus, and for transmitting instructions to the air heater, the energizing apparatus, and the spark plug. The one or more apertures further define a plurality of combustion paths allow an ignited fuel and air mixture from the pre-chamber to efficiently enter and create efficient combustion of the fuel and air mixture within the combustion chamber. The control module executes control logic for preheating the air in the intake duct by engaging the air heater to pre-heat air entering the combustion chamber to increase combustion efficiency of the combustion of the air and fuel mixture within the combustion chamber from a first efficiency level to a second efficiency level greater than the first efficiency level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
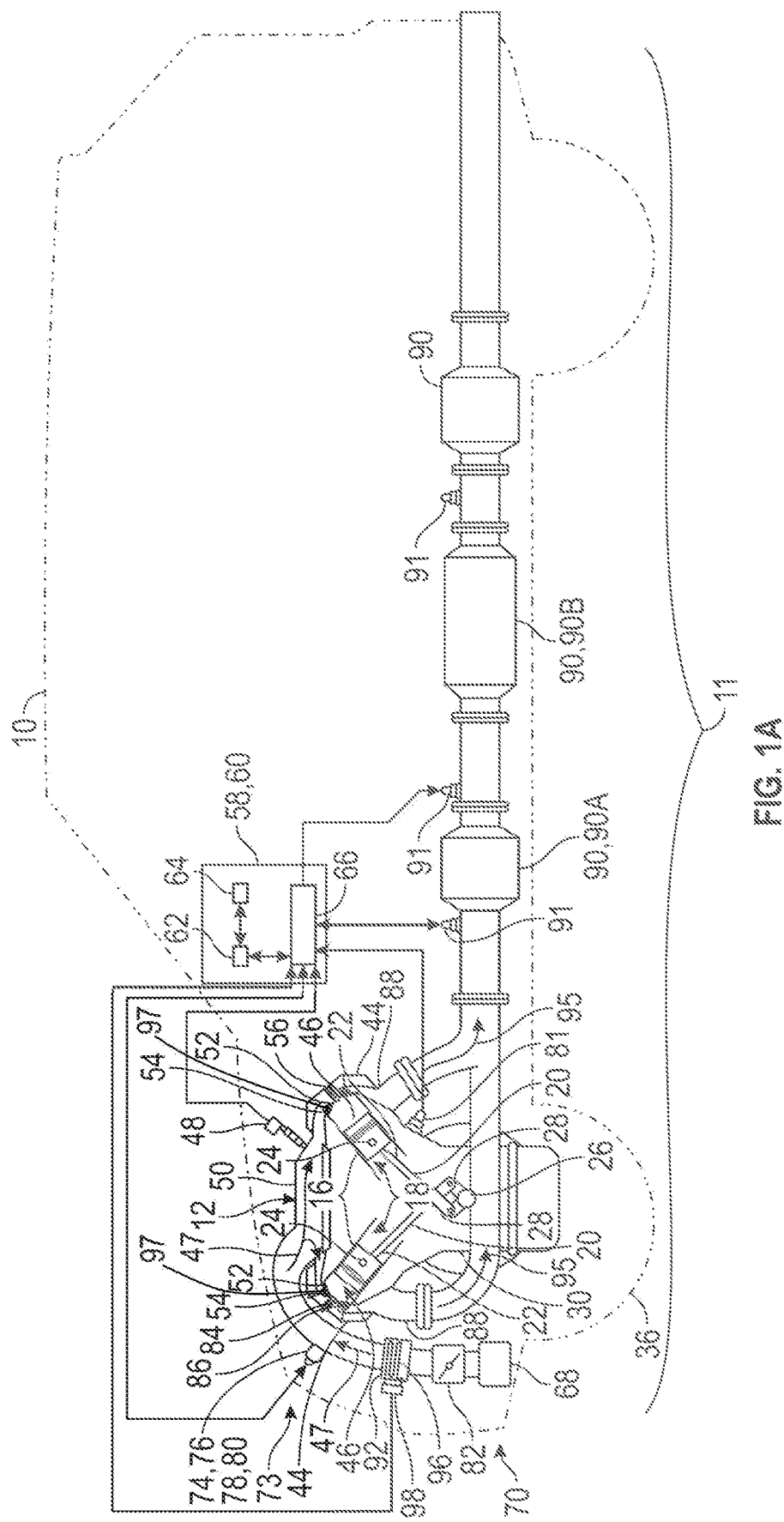
FIG. 1A is an environmental view of a motor vehicle having a system for intake air heating with pre-chamber ignition in a gasoline engine according to an aspect of the present disclosure.
Figure 1B:
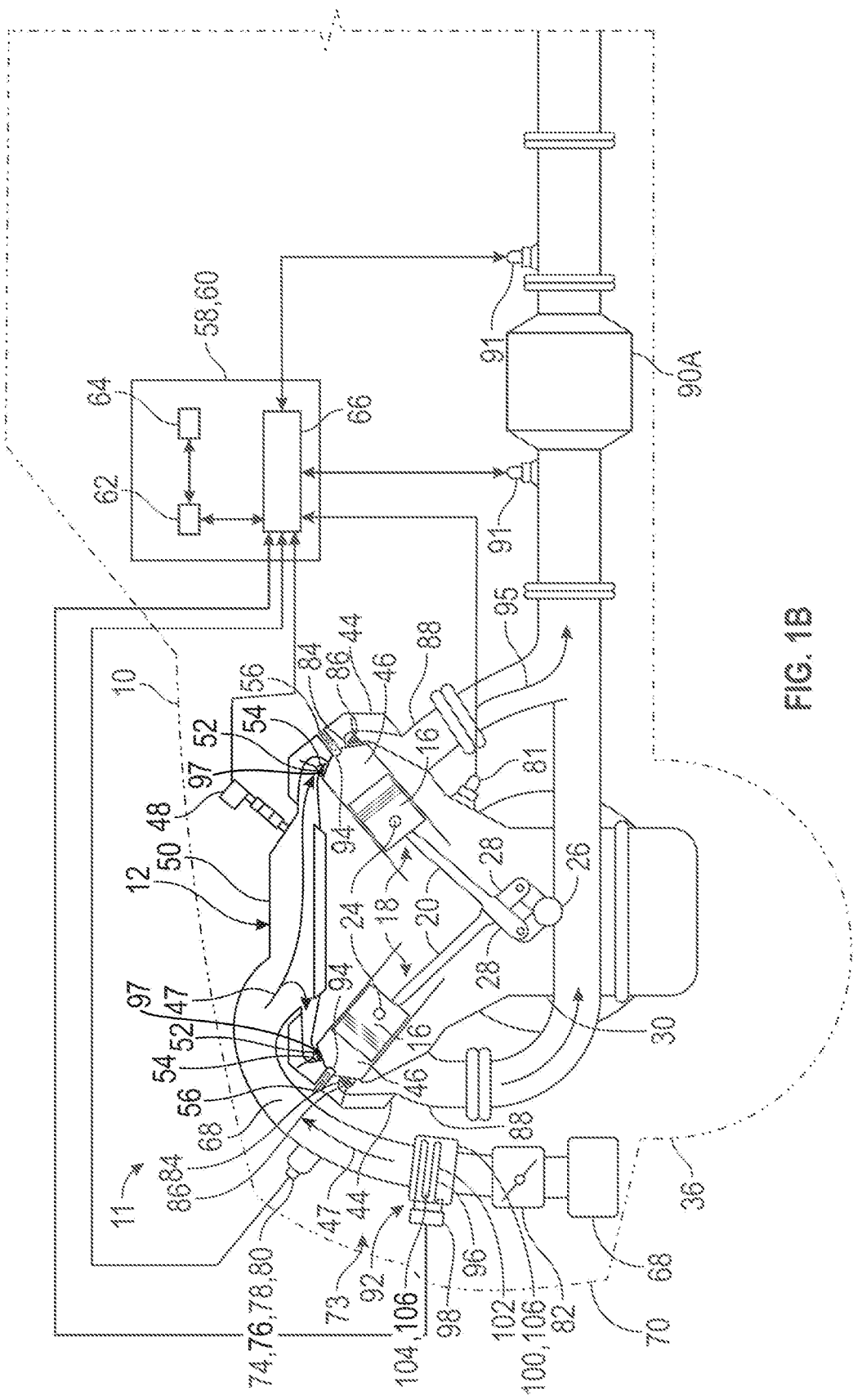
FIG. 1B is a schematic view of a portion of the motor vehicle of FIG. 1A showing additional details of the system for intake air heating with pre-chamber ignition in a gasoline engine according to another aspect of the present disclosure.

Referring to FIGS. 1A and 1B, a motor vehicle 10 having a system 11 for heating intake air with pre-chamber ignition in a gasoline internal combustion engine 12 is shown. The motor vehicle 10 has an internal combustion engine 12 and a transmission 14. In several aspects, the engine 12 is of the four-stroke gasoline-fueled spark-ignition type. However, other embodiments are envisioned herein, including but not limited to engines 12 fueled by gasoline, ethanol, hydrogen, natural gas, propane, other gaseous or liquid fuels, and/or hybrid combinations of fuel types. In addition, the engine 12 may be used in hybrid applications that include one or more power sources in addition to the engine 12, such as batteries, fuel cells, electric motors and the like.

The engine 12 is of the reciprocating piston type having one or more reciprocating pistons 16 moving in substantially linear paths within cylinders 18 of the engine 12. The pistons 16 are rotatably connected to connecting rods 20 at a connecting rod small end 22 by a piston pin 24 or other similar hinged coupling. The connecting rods 20 are journaled to or rotatably coupled to a crankshaft 26 at a connecting rod big end 28. The big end 28 is disposed longitudinally opposite the small end 22 of each of the connecting rods 20. The big end 28 has a larger diameter than the small end 22. The crankshaft 26 is rotatably supported by and disposed in an engine block 30. The crankshaft 26 is also rotatably coupled to a transmission input 32. A transmission output 34 is coupled to drive wheels 36 through a drive shaft, a differential gearset, and at least one set of half-shafts (not shown).

The engine block 30 terminates at an upper extremity at an interface with a head 44. A portion of the head 44 defines an axial end of each of the cylinders 18. Together, the head 44, the cylinders 18, and the pistons 16 define a plurality of combustion chambers 46. The combustion chambers 46 are variable volumes in which controlled combustion of fuel and air 47 occurs. Fuel is provided to the combustion chambers 46 via fuel fuel injectors 48. The fuel fuel injectors 48 may take a variety of forms without departing from the scope or intent of the present disclosure. In one example, the fuel fuel injectors 48 are mounted to the head 44 in a direct-cylinder-injection engine. In another example, the fuel fuel injectors 48 are mounted to an intake manifold 50 in a port-injected engine. The intake manifold 50 is mounted to the head 44. In a further example, the fuel fuel injectors 48 are mechanical devices such as carburetors which receive both air 47 and fuel and distribute a fuel-air mixture into the intake manifold 50 of the engine 12.

Likewise, air 47 is provided to the combustion chambers 46 of the engine via intake ports 52 formed in the head 44. An intake valve 54 is disposed in each of the intake ports 52 and selectively obstructs or closes the intake ports 52 during predetermined portions of an engine cycle. When the intake valves 54 are in an open position, air 47 flows through the intake ports 52 into the cylinder 18. Subsequently, air 47 and fuel is mixed within the combustion chamber 46 and then compressed as the piston 16 moves towards the top of the combustion chamber 46. The air-fuel mixture is then ignited by a spark. The spark is generated by a spark plug 56 disposed in the head 44. The spark plug 56 generates the spark at precise predetermined times during the engine cycle. In some examples, the timing of the spark generation is controlled by an onboard control module 58 such as an engine control unit (ECU) 60, engine control module (ECM), or ignition control module, a mechanical timing device such as a distributor, or the like.

The control module 58 is a non-generalized, electronic control device having a preprogrammed digital computer or processor 62, non-transitory computer readable medium or memory 64 used to store data such as control logic, software applications, instructions, computer code, data, lookup tables, etc., and a transceiver or input/output (I/O) ports 66. The memory 64 includes any type of medium capable of being accessed by a computer, such as read only memory (ROM), random access memory (RAM), a hard disk drive, a compact disc (CD), a digital video disc (DVD), or any other type of memory 64. A non-transitory computer readable medium or memory 64 excludes wired, wireless, optical, or other such communication links that transport transitory electrical or other signals. A non-transitory computer readable medium or memory 64 includes media where data can be permanently stored and media where data can be stored and later overwritten, such as a rewritable optical disc, or an erasable memory device. Computer code includes any type of program code or control logic, including source code, object code, and executable code. The processor 62 is configured to execute the code, control logic, or instructions. In some examples, the computer code includes one or more applications, such as software programs configured to perform a specific function or set of functions. The applications may further include one or more computer programs, software components, sets of instructions, procedures, functions, objects, classes, instances, related data, or a portion thereof adapted for implementation in a suitable computer readable program code. The applications may be stored in the memory 64 or in additional or separate memory 64.

Referring once more to FIGS. 1A and 1B, the intake manifold 50 is attached to the head 44 and provides air 47 from outside the motor vehicle 10 to the intake ports 52 of the engine 12. The intake manifold 50 extends from the head 44 to an air intake 68. The air intake 68 of the example shown in FIGS. 1A and 1B is disposed proximate an exterior surface 70 of the motor vehicle 10. However, it should be appreciated that the precise location of the air intake 68 may vary substantially from application to application and may not be proximate the exterior surface 70 at all in some examples. Furthermore, it should be appreciated that while the air intake 68 is shown as a singular intake air duct 73 in FIGS. 1A and 1B, other configurations are possible. In a non-limiting example, in some applications the air intake 68 is formed as a plurality of air ducts 73, such as one for each bank of cylinders 18 in a flat or v-shaped engine configuration. In a further example, the air intake 68 is formed as a plurality of intake air ducts 73 such that there is an intake air duct 73 for each of the cylinders 18 in the engine 12.

In some examples, one or more sensors 74 such as a mass airflow (MAF) sensor 76, a manifold absolute pressure (MAP) sensor 78, an intake air temperature (IAT) sensor 80, an engine coolant temperature (ECT) sensor 81 or the like may be disposed on or in the air intake 68, the intake manifold 50, or both. Likewise, a throttle body 82 is disposed in the intake manifold 50, or in the air intake 68, or between the intake manifold 50 and the air intake 68, or between the intake manifold 50 and the head 44 of some examples. The throttle body 82 meters and/or controls a volume of air 47 flowing into the engine 12. In some examples, the throttle body 82 is a butterfly valve, or the like. The sensors 74 and the throttle body 82, as well as a variety of other electrical and/or electromechanical devices communicate with the I/O ports 66 of the ECU 60. The processor 62 of the ECU 60 executes control logic or computer executable program code portions stored in the memory 64 to manage or control various operations of the engine 12. In an example, the MAF sensor 76, MAP sensor 78, and/or IAT sensor 80 read a mass flow, pressure, and/or temperature of the air 47 in the intake, the ECT sensor 81 detects a temperature of engine coolant (not shown) circulating within the engine 12, and the I/O ports 66 of the ECU 60 receive the volume, pressure and/or temperature readings. The I/O ports 66 transfer those readings to the processor 62 where the processor 62 executes control logic stored in memory 64 to interpret the readings and generate an output to one or more actuators or electronic devices within the motor vehicle 10. Thus, upon receiving data from the IAT sensor 80 the processor 62 may determine that the intake air 47 temperature or the ECT temperature is below a predetermined threshold for ideal cold-start operation of the engine 12. The processor 62 may then execute control logic that is transmitted to the throttle body 82 via the I/O ports 66 to command a particular throttle body 82 position during the cold-start.

Referring once more to FIGS. 1A and 1B, the combustion reaction of air 47 and fuel within the combustion chamber 46 results in both motion of the piston 16 within the cylinder 18, as well as a release of thermal energy and spent or exhaust gases. The exhaust gases and some of the thermal energy escape from the combustion chambers 46 via exhaust ports 84 formed in the head 44. An exhaust valve 86 is disposed in each of the exhaust ports 84 and selectively obstructs or closes the exhaust ports 84 during predetermined portions of the engine cycle. Thus, when the exhaust valves 86 are in an open position, exhaust gases flow out of the combustion chambers 46 and into an exhaust manifold 88 mounted to the head 44. In some examples, the intake manifold 50 is mounted to the head 44 opposite the exhaust manifold 88, however it should be appreciated that other configurations are possible and do not depart from the scope or intent of the present disclosure.

Exhaust gases flow through the exhaust manifold 88 and through one or more catalytic converters 90. Depending on the application, the engine 12 may be equipped with varying quantities of catalytic converters 90. In one example, the engine 12 is equipped with a light-off catalytic converter 90a disposed in the stream of exhaust just downstream of the exhaust manifold 88. A secondary catalytic converter 90b is disposed in the exhaust stream and downstream of the light-off catalytic converter 90a. The catalytic converters 90 alter the chemical components of the exhaust gases to reduce or substantially eliminate the environmentally damaging constituents of internal combustion engine-produced exhaust gases. Catalytic converters 90 include two-way, three-way, and three-way plus oxidation catalytic converters 90. In order to operate efficiently to successfully remove environmentally damaging constituents from the exhaust gases, the catalytic converters 90 generally need to be heated to a predetermined operating temperature range. Accordingly, during cold start conditions, such as when the motor vehicle 12 has been sitting unused overnight, the catalytic converters 90 take some time to achieve the predetermined operating temperature range. Similarly, during some engine 12 operating conditions, such as very cold ambient air 47 temperatures, the catalytic converters 90 may fall below ideal operating temperatures. One or more exhaust sensors 91, such as exhaust gas temperature (EGT) sensors and/or oxygen (O2) sensors are disposed in the stream of the exhaust gas 95. The exhaust sensors 91 detect exhaust characteristics, such as the temperature of the exhaust gas 95 or the exhaust constituent amounts in the exhaust gas 95. In an example, the O2 readings are reported back to the ECU 60 which can make determinations as to whether or not threshold exhaust constituent ratios are being met. In order to achieve the exhaust constituent thresholds, the catalytic converters 90 typically need to be operating within predetermined temperature ranges. Accordingly, it is desirable for the engine 12 to generate exhaust gases with thermal energy sufficient to heat the catalytic converters 90 efficiently under most, if not all conditions, including cold-start and the like.

In search of improved emissions, many manufacturers are increasingly turning to engines 12 using higher and higher compression ratios. For example, typical naturally aspirated gasoline engines 12 in passenger vehicles from the 1990's had compression ratios in the 9.0:1 to 10.5:1 range. By contrast, many naturally aspirated gasoline engines 12 in passenger vehicle applications in the mid 2010's had compression ratios in the 10.0:1 to 13:1, and in some cases, even higher. Increased compression ratios can result in less fuel being used to generate similar power and/or torque from a gasoline engine 12, at the risk of increased knock or pre-ignition. Knock and pre-ignition are, fundamentally, the uncontrolled combustion of the air-fuel mixture within the combustion chamber 46. Both knock and pre-ignition can damage the internal components of an engine 12 and are therefore avoided where possible.

Internal combustion engines 12 also operate at varying efficiencies at varying operating temperatures. Specifically, during cold-start conditions, lubricants such as engine oil and transmission fluid within the engine 12 and transmission 14 have increased viscosity in relation to at warmer temperatures. Accordingly, mechanical components of the engine 12 and transmission 14 operate with increased frictional losses at cold-start than after the lubricants have been warmed above cold-start temperatures. Thus, like the catalytic converters 90, the engine 12 and transmission 14 have optimal operating temperature ranges. Furthermore, it is desirable for the engine 12, transmission 14, and other components, such as the catalytic converters 90 to rapidly reach optimal operating temperatures to reduce frictional inefficiencies and unwanted combustion emissions.

Figure 3:
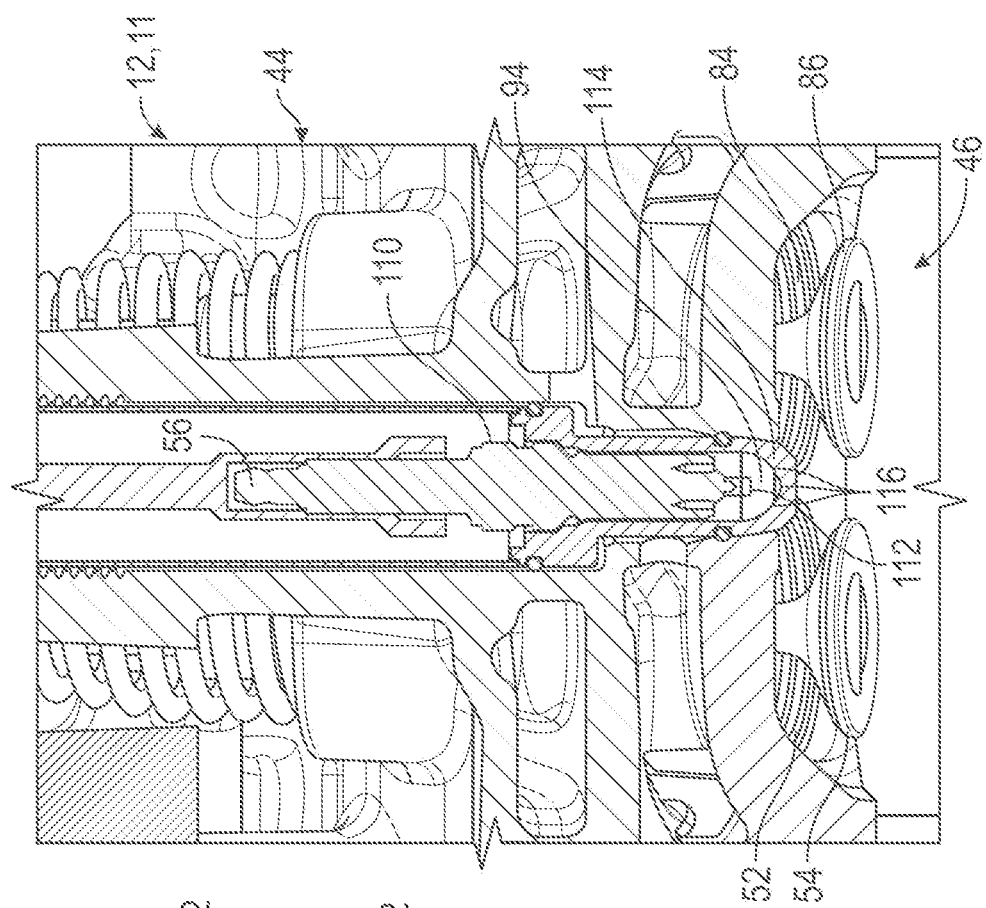
FIG. 3 is a section view of a portion of a head and combustion chamber of a gasoline internal combustion engine showing the pre-chamber ignition portion of the system for intake air heating with pre-chamber ignition in a gasoline engine according to an aspect of the present disclosure.
Figure 2:
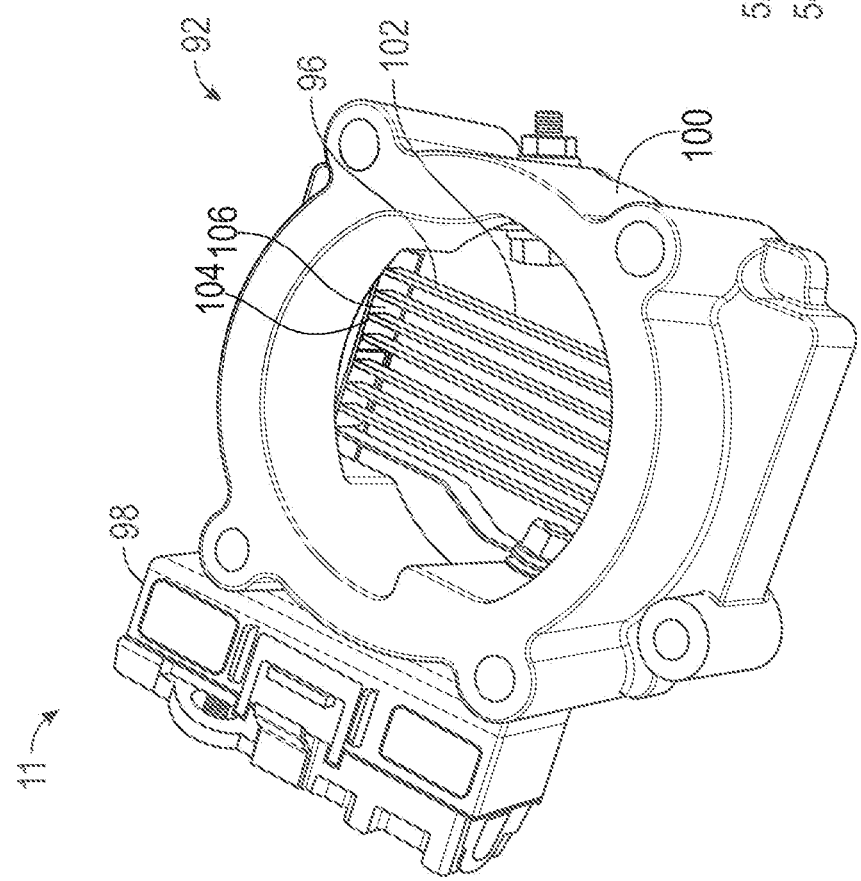
FIG. 2 is a perspective view of an air heater of a system for intake air heating with pre-chamber ignition in a gasoline engine according to an aspect of the present disclosure.

Turning now to FIGS. 2 and 3 and with continuing reference to FIGS. 1A and 1B, the system 11 for intake air 47 heating with pre-chamber ignition is shown in further detail. In order to improve the rate at which engine 12 components, as well as catalytic converters 90 reach optimal operating temperatures, the engine 12 is equipped with an air heater 92 and an ignition pre-chamber 94. The air heater 92 is coupled or mounted to at least one of the intake air ducts 73. The air heater 92 may take a variety of different forms, but generally includes a heating element 96 electrically coupled to an energizing apparatus 98. The energizing apparatus 98 transfers electrical energy, mechanical energy, or the like into the heating element 96. The heating element 96 converts the electrical, mechanical, or other such energy from the energizing apparatus 98 into thermal energy. In some examples, the energizing apparatus 98 is a battery (not specifically shown) or other such electrical power supply which is instructed by the ECU 60 to generate and/or transfer thermal energy to the intake air. The heating element 96 is positioned in a heat transfer relationship with air 47 in the intake air duct 73 so that the thermal energy in the heating element 96 is transferred to the air 47. The heating element 96 is supported by a support structure 100.

In one example, the heating element 96 is formed of thermally and/or electrically conductive wire or other such filaments formed of metals, metal alloys, ceramics, or other such materials. The wire or similar materials are formed into a plurality of linear portions 102 connected by a plurality of angular bent portions 104. The angular bent portions may be bent at any of a wide variety of different angular measures, but in one example 180-degree bends are used. Similarly, the heating element 96 of some examples is formed of thermally and/or electrically conductive planar material interconnected by a plurality of bent portions 104. Thus, the planar or linear portions 102 of the heating element 96 are positioned between the bent portions. The support structure 100 includes a plurality of flange portions 106 positioned adjacent the plurality of planar or linear portions 102, such that the planar or linear portions 102 are spaced apart from and positioned substantially parallel to one another. Furthermore, the flange portions 106 of some examples engage with the intake air duct 73 to fix the position of the air heater 92 within the intake air duct 73.

In one example, the air heater 92 defines a cartridge disposed in the intake air duct 73 within the head 44 and proximate or adjacent to the combustion chamber 46. Depending on the construction and thermal properties of the engine 12, the air heater 92 cartridge may be disposed at several different locations in the intake air ducts 73 of the engine 12. The air heater 92 cartridge may be placed into the intake ports 52 of the head 44, so that the cartridge does not substantially obstruct airflow through the intake ports 52 but does provide efficient transfer of thermal energy from the heating element 96 into the intake air. Thus, the heating element 96 defines a liner 97 for each of the intake ports 52. In some examples, the intake port liner 97 is a substantially cylindrical sleeve disposed in the intake port 52 proximate or adjacent to, but also external to the combustion chamber 46.

In another example, the heating element 96 includes a thermally conductive molded component (not specifically shown) disposed in the intake manifold 50 of the engine 12. More specifically, the molded component is designed as a part of the intake manifold 50 and the molded component is either overmolded onto the intake manifold 50 or vice versa during manufacture. The molded component may take a variety of different forms, but generally includes a heating element 96 as described above. However, depending on the shape and construction of the intake manifold 50, the heating element 96 may be a substantially cylindrical portion of the intake manifold 50 defining an intake air duct 73, conduit, passage, or the like. To effectively communicate thermal energy from the heating element 96 to the air in the intake manifold 50, the heating element 96 is shaped and sized to provide a maximum surface area in contact with the air. Thus, the heating element 96 may define substantially all of an interior surface of the intake manifold 50, or any portion thereof. Similarly, the heating element 96 may have a plurality of linear portions 102 connected by a plurality of angular bent portions 104. The linear portions 102 of some examples are substantially planar vanes and are oriented in the intake manifold 50 substantially parallel to the direction of airflow through the intake manifold 50.

Referring now to FIG. 3 and with continuing reference to FIGS. 1A, 1B, and 2, the ignition pre-chamber 94 is shown in more detail. In order to further improve the efficiency and efficacy of the cold-start engine 12 warm-up procedure, it is desirable to ignite and combust substantially all of the fuel and air in the combustion chamber 46. During a cold-start condition, as well as under certain other operating conditions, the engine block 30, head 44, and piston 16 may be significantly colder than the air-fuel mixture. Additionally, the air-fuel mixture may be non-homogenous. Both the temperature of the air-fuel mixture proximate the boundaries of the combustion chamber 46 and the homogeneity of the air-fuel mixture can affect the completeness of combustion of the air-fuel mixture. In order to improve both the homogeneity of the mixture, and to more efficiently and completely combust the air-fuel mixture, the spark plug 56 is disposed not just in the head 44, but within the pre-chamber 94 formed in the head 44.

The pre-chamber 94 defines a substantially cylindrical threaded fixture 110 into which the spark plug 56 is inserted and disposed in threaded engagement. The tip 112 of the spark plug 56 is disposed the pre-chamber 94 which defines a small cavity separated by a wall 114 from the combustion chamber 46. It should be appreciated that the precise shape and location of the pre-chamber 94 may vary from application to application, but in FIG. 3 is shown at substantially the top of the combustion chamber 46 between the intake and exhaust valves 54, 86. In the example of FIG. 3, the pre-chamber 94 is substantially hemispherical and surrounds the tip 112 of the spark plug 56. That is, the wall 114 separating the pre-chamber 94 and the combustion chamber 46 is convex and protrudes slightly into the combustion chamber 46. In an example, the pre-chamber 94 has a volume of up to about 2 cubic centimeters, however the precise volume of the pre-chamber 94 may vary substantially from application to application. A plurality of apertures 116 are formed through the wall 114 and define a plurality of fluid communication paths between the combustion chamber 46 and the pre-chamber 94. The quantity, orientation and shape of the apertures 116 may vary from application to application. In several examples, between 4 and 10 apertures 116 are formed through the wall 114. The air-fuel mixture is injected or fed into the combustion chamber 46 and as the piston 16 traverses the cylinder 18 during a compression stroke of an engine cycle, the compressed air-fuel mixture feeds into the pre-chamber 94 via the plurality of apertures 116. The spark plug 56 then ignites the air-fuel mixture within the pre-chamber 94, generating a very fast burn duration and flame front that expands rapidly and efficiently throughout the combustion chamber 46.

The rapidity of the burn duration that results from pre-chamber 94 ignition allows for engines 12 to use an increased compression ratio by consuming the air-fuel charge prior to knock or preignition initiation. Additionally, by combining the thermal gains offered by the activation of the air heater 92 with the pre-chamber 94, the combustion efficiency of the engine 12 is increased from a first efficiency level to a second efficiency level greater than the first efficiency level. In several aspects, the increased combustion efficiency satisfies both emissions targets and increases fuel efficiency of the engine 12 at low operating temperatures, such as at cold-start. In an example, in order to satisfy emissions targets and fuel efficiency targets, the combustion efficiency is above about 95%. The combustion efficiency is a measure of how well the fuel being burned is being used in the combustion process. In a specific example, the combustion efficiency targets are between about 95% and about 97%, where "about" denotes a variation of up to 0.5%. However, it should be appreciated that depending on the application and specifications of the engine 12, target combustion efficiencies may vary from the above without departing from the scope or intent of the present disclosure.

Figure 4:
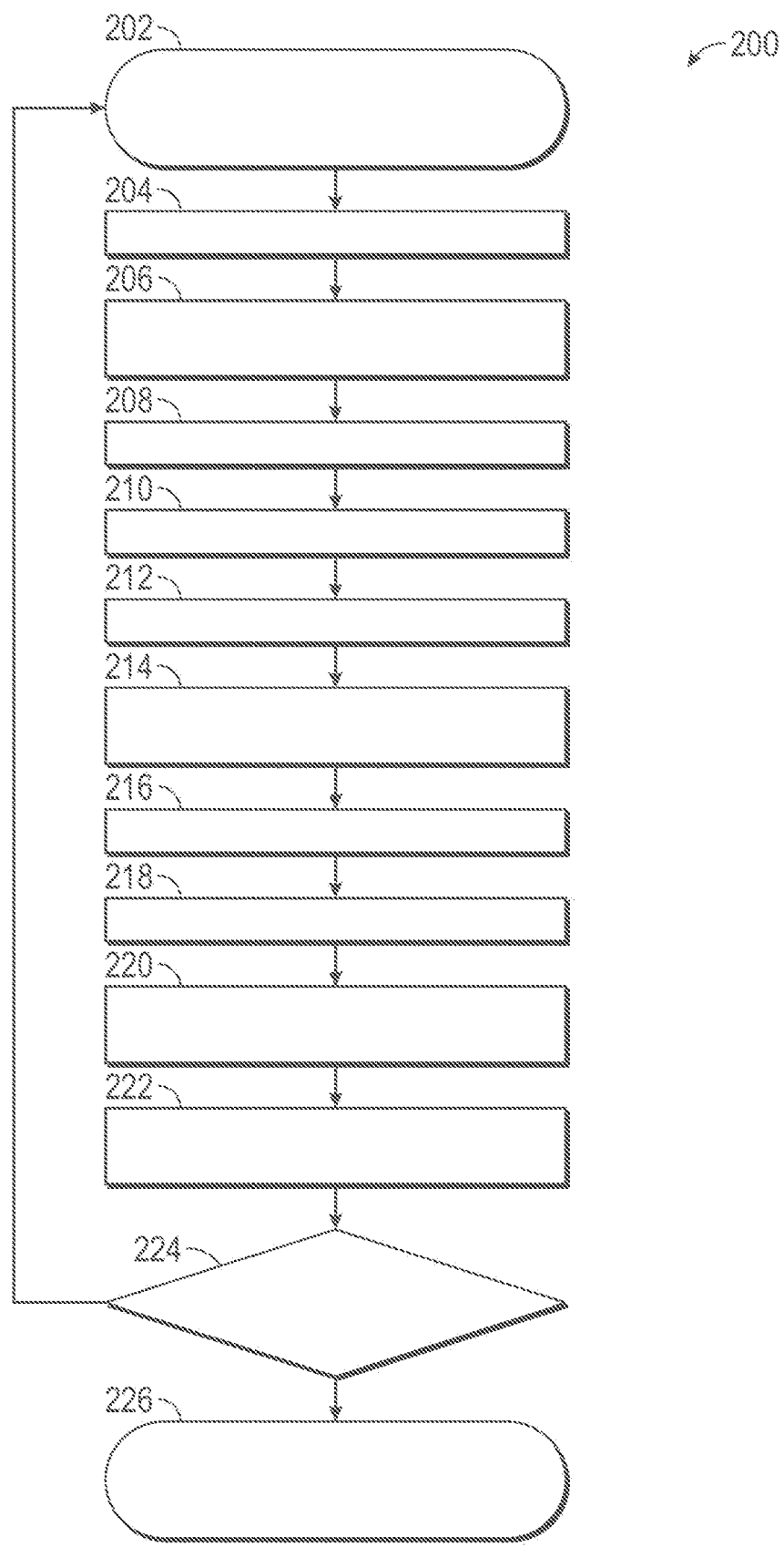
FIG. 4 is a method of operating a system for intake air heating with pre-chamber ignition in a gasoline engine according to an aspect of the present disclosure.

Turning now to FIG. 4, and with continuing reference to FIGS. 1-3, a method for utilizing the system of intake air heating with pre-chamber 94 ignition in a gasoline engine 12 is described. The method 200 begins at block 202, where the ECU 60 receives a startup command from a motor vehicle user. The startup command may be the user moving an ignition key (not shown) to an "on" or "start" position, or the command may be a user pushing an "engine start" button (not shown), or other similar procedures. Likewise, the startup command in a motor vehicle 10 equipped with stop/start technology may be a predetermined brake pedal position, a predetermined accelerator pedal position, or the like. At block 204, the ECU 60 receives data from the sensors 74 and executes control logic that compares measured air 47 and/or coolant temperatures to predefined threshold air 47 and/or coolant temperatures. If the measured temperatures are below the threshold temperatures, the ECU 60 executes control logic that instructs the air heater 92 to deliver thermal energy to the intake air by heating the heating element 96.

At block 206, an engine starter (not specifically shown) is energized to create engine rotation, and the pre-warmed intake air 47 is drawn through and traverses the intake system including the air intake 68 and the intake manifold 50. The pre-warmed intake air 47 then enters the combustion chamber 46 via one or more intake ports 52. More specifically, the intake valves 54 are opened, the exhaust valves 86 are closed or are closing, and air is allowed to pass through the intake ports 52 into the combustion chamber 46. At block 206, a predetermined quantity of fuel is injected by the fuel injectors 48 into the intake port or combustion chamber 46 depending upon fuel system specified as well. The quantity of fuel is calculated by the ECU 60 to fully combust with a known quantity of intake air measured by the one or more sensors 74. At block 208, as the piston 16 moves upward towards the head 44 within the cylinder 18 during a compression stroke, the air-fuel mixture is compressed and forced through the apertures 116 in the wall 114 and into the pre-chamber 94.

At block 210, at a predetermined point in the piston's 16 travel, the ECU 60 sends a command to the spark plug 56 via the I/O ports 66 to generate a spark. At block 212, the spark ignites the volume of air-fuel mixture within the pre-chamber 94. Since the volume of the pre-chamber 94 is relatively small in comparison with the combustion chamber 46, the air-fuel mixture within the pre-chamber 94 ignites. At block 214, the flame front generated by the ignition within the pre-chamber 94 passes through the apertures 116 and traverses substantially the entirety of the combustion chamber 46 igniting and combusting the entirety of the air-fuel mixture very rapidly and completely in the process. At block 216, the expanding exhaust gases generated by the combustion reaction force the piston 16 back down the length of the cylinder 18 during the expansion or power stroke of the engine cycle. At block 218, the exhaust valves 86 are opened, the piston 16 reverses course and moves upwards towards the head 44 once more in an exhaust stroke of the engine cycle. At block 220, the exhaust valves 86 are closed or closing, the intake valves 54 are opened, and more air and fuel are injected or brought into the combustion chamber 46 as the piston 16 recedes once more away from the head 44 and towards a bottom of the cylinder 18.

At block 222, as the engine 12 runs, the ECU 60 monitors various operational parameters of the engine 12. In some examples, the operational parameters include, but are not limited to: exhaust gas temperatures, emissions constituents, catalytic converter temperatures, engine coolant temperatures, intake air temperatures, and the like. The ECU 60 then determines whether to continue utilizing the air heater 92 to pre-heat intake air. At block 224, if ECU 60 determines that the engine's 12 operational parameters are below a threshold value for one or more of the above characteristics, the ECU 60 continues to command the air heater 92 to run, and the method 200 returns to block 202. At block 224, when the ECU 60 determines that the engine 12 is operating at or above the threshold values for the operational parameters, the ECU 60 commands the air heater 92 to shut off and the method 200 proceeds to block 226. In some specific examples, when the ECT sensor 81 informs the ECU 60 that the engine coolant temperature is at or above about 85° Celsius, the ECU 60 commands the air heater 92 to disengage or shut off, and the engine 12 is allowed to either start or continue running normally. In shutting off the air heater 92, the ECU 60 commands the energizing apparatus 98 to de-power, or otherwise cease providing electrical or thermal energy to the air heater 92. It should be appreciated that the mention of 85° Celsius is intended only as a non-limiting example.

However, if at block 224, the ECU 60 determines that the engine 12 is operating below one or more of the threshold values for the operating parameters, the method proceeds back to block 202 and continues measuring air 47 and/or engine coolant temperatures, comparing those temperatures to threshold temperature values, and executing control logic to continue utilizing the air heater 92 until the threshold temperature values are met. Even at block 226, the ECU 60 periodically and/or continuously monitors the operational parameters of the engine 12. If one or more of the operational parameters falls below the threshold value, the ECU 60 commands the air heater 92 to turn on and the method 200 returns to block 202. For example, the ECU 60 periodically and/or continuously monitors the ECT using the ECT sensor 81. When the ECT sensor 81 reports an ECT of between 60° Celsius and 85° Celsius, the ECU 60 may command the air heater 92 to remain off, based on engine 12 performance, runtime, and the like. Additionally, the ECU 60 uses the IAT sensor 80 in combination with the ECT sensor 81 to determine whether the engine 12 is operating within predetermined temperature parameters. That is, when the IAT sensor 80 reports an air 47 temperature of between about 15° Celsius and about 25° Celsius, and the ECT sensor 81 reports a temperature of between about 60° Celsius and 85° Celsius, the ECU 60 commands the air heater 92 to remain off. However, if the IAT sensor 80 reports an air 47 temperature of 0° Celsius and the ECT sensor 81 reports an ECT temperature of 60° Celsius, the ECU 60 may command the air heater 92 to engage and heat the intake air 47. Likewise, if the IAT sensor 80 reports an air 47 temperature of 40° Celsius, and the ECT sensor 81 reports the ECT temperature is 60° Celsius, the ECU 60 may determine that the air heater 92 is not needed to heat the intake air 47. While specific ECTs and IATs have been discussed above, it should be appreciated that variations in temperature from the above-referenced values are intended to be within the scope of the present disclosure.

A system and method for intake air heating with pre-chamber ignition in a gasoline engine 12 offers several advantages. These include reduced emissions, increased engine and catalyst warm-up rates, and maintaining or reducing engine and/or electrical system complexity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An internal combustion engine with an intake air heater for a motor vehicle, the internal combustion engine comprising:
   a head defining a portion of a combustion chamber;
   an air intake duct feeding fresh air into the combustion chamber through at least one intake port, the intake port formed through the head;
   at least one fuel injector, the fuel injector disposed in the head or intake duct and being selectively activated to supply fuel to the combustion chamber;
   a pre-chamber formed in the head, the pre-chamber at least partially separated from the combustion chamber by a wall;
   one or more apertures formed through the wall, the one or more apertures providing fluid communication paths from the combustion chamber to the pre-chamber and feeding a mixture of air and fuel from the combustion chamber to the pre-chamber;
   an air heater coupled to the intake duct and positioned in a heat transfer relationship with air in the intake duct; and
   wherein the one or more apertures further define a plurality of combustion paths allowing an ignited fuel and air mixture from the pre-chamber to efficiently enter and combust the fuel and air mixture within the combustion chamber, and wherein selective activation of the air heater and the pre-chamber increase combustion efficiency from a first combustion efficiency level to a second combustion efficiency level greater than the first combustion efficiency level, wherein the air heater is selectively activated when a temperature and constituent components of exhaust gasses are above threshold quantity values, and the air heater is selectively deactivated when a temperature and constituent components of the exhaust gasses are below threshold quantity values.

2. The internal combustion engine of claim 1 further comprising:
an engine block defining at least one cylinder, the cylinder having a longitudinal axis;
a piston mounted within the cylinder and sliding along the longitudinal axis within the cylinder, the piston defining with the cylinder and the head, the combustion chamber;
at least one intake valve disposed in the head and acting on the intake port and controlling an amount of air entering the combustion chamber;
at least one sensor, the sensor detecting an air temperature of the air in the intake duct, an engine coolant temperature, or a temperature and chemical composition of exhaust gasses in an exhaust duct;
an exhaust duct communicating with the combustion chamber through at least one exhaust port, the exhaust duct formed through the head and extracting exhaust gasses from the cylinder, the exhaust gasses being formed at a conclusion of a combustion reaction of the air and the fuel;
at least one exhaust valve acting on the exhaust port and controlling an amount of exhaust gasses departing the combustion chamber through the exhaust port;
an energizing apparatus selectively providing electrical energy to the air heater, the air heater converting the electrical energy into thermal energy and transferring the thermal energy to the air in the intake duct to preheat the air prior to the air entering the combustion chamber;
a spark plug mounted on the head within the pre-chamber and acting inside the pre-chamber for cyclically and selectively igniting the fuel and air mixture present in the pre-chamber and for initiating the combustion reaction; and
a control module in electronic communication with the air heater, the energizing apparatus, the spark plug, and the at least one sensor, the control module having a memory for storing control logic, a processor for executing the control logic, and a plurality of input/output ports for receiving data from the at least one sensor, from the air heater, and from the energizing apparatus, and for transmitting instructions to the air heater, to the energizing apparatus, and to the spark plug; and
wherein the control module executes control logic for preheating the air in the intake duct by engaging the air heater to pre-heat air entering the combustion chamber to increase efficiency of the combustion reaction of the air and fuel mixture within the combustion chamber from the first combustion efficiency level to the second combustion efficiency level.

3. The internal combustion engine of claim 2 wherein the air heater further includes:
a heating element, the heating element disposed in the intake duct; and
a support structure to support the heating element and positioning the heating element in contact with the air in the intake duct.

4. The internal combustion engine of claim 3 wherein the heating element includes a plurality of 180-degree bends and a plurality of planar portions positioned between the 180-degree bends; and wherein the support structure further includes a plurality of flange portions positioned adjacent the plurality of planar portions, wherein the plurality of planar portions are spaced apart from and positioned substantially parallel to one another.

5. The internal combustion engine of claim 3 wherein the heating element defines a cartridge disposed in the intake duct within the head of the internal combustion engine and adjacent to the combustion chamber, the cartridge having a portion formed of thermally conductive material.

6. The internal combustion engine of claim 3 wherein the heating element includes:
an intake port liner, the intake port liner shaped to be received by the intake port and including an air passage portion allowing air to flow through the intake port liner and into the combustion chamber, at least a portion of the intake port liner defining the heating element wherein the heating element is formed of thermally conductive material.

7. The internal combustion engine of claim 3 wherein the heating element includes:
a thermally conductive molded component, the thermally conductive molded component disposed in an intake manifold of the internal combustion engine.

8. The internal combustion engine of claim 3 wherein the pre-chamber is only fed with the air and fuel mixture present in the combustion chamber during movement of the piston towards the head.

9. The internal combustion engine of claim 3 wherein the wall between the pre-chamber and the combustion chamber is convex and protrudes into the combustion chamber.

10. The internal combustion engine of claim 3 wherein the pre-chamber has a volume of up to about two cubic centimeters, and wherein the wall between the pre-chamber and the combustion chamber includes up to ten apertures.

11. A combustion method for a motor vehicle internal combustion engine having an intake air heater, the method comprising:
utilizing an internal combustion engine having:
a head defining a portion of a combustion chamber;
an air intake duct feeding fresh air into the combustion chamber
through at least one intake port, the intake port formed through the head;
at least one fuel injector, the fuel injector disposed in the head or intake duct and being selectively activated to supply fuel to the combustion chamber;
a pre-chamber formed in the head, the pre-chamber at least partially separated from the combustion chamber by a wall;
one or more apertures formed through the wall, the one or more
apertures providing fluid communication paths from the combustion chamber to the pre-chamber and feeding a mixture of air and fuel from the combustion chamber to the pre-chamber; and
positioning an air heater in a heat transfer relationship with air in the intake duct of the internal combustion engine, the air heater electrically coupled to an energizing apparatus and a control module;
selectively engaging the energizing apparatus to activate the air heater when the control module determines that a temperature of a air in the intake duct is below a threshold air temperature, a temperature of coolant in the internal combustion engine is below a threshold coolant temperature, and a temperature and constituent components of exhaust gases are above threshold quantity values;

selectively de-energizing the energizing apparatus to deactivate the air heater when a temperature and constituent components of the exhaust gasses are below threshold quantity values, and wherein the one or more apertures further define a plurality of combustion paths allowing an ignited fuel and air mixture from the pre-chamber to efficiently enter and combust the fuel and air mixture within the combustion chamber, and wherein selective activation of the air heater in support of the pre-chamber increase combustion efficiency from a first combustion efficiency level to a second combustion efficiency level greater than the combustion first efficiency level.

12. The method of claim 11 further comprising:

sensing a temperature of the air in the intake duct with a sensor disposed in the intake duct;

sensing a temperature of engine coolant in the internal combustion engine with an engine coolant temperature sensor disposed on the internal combustion engine;

preheating the air in the intake duct by utilizing the energizing apparatus to provide electrical energy to the air heater, the air heater converting the electrical energy into thermal energy and transferring the thermal energy to the air in the intake duct before the air enters a combustion chamber of the internal combustion engine;

injecting fuel into the combustion chamber or intake duct with the fuel injector;

feeding a mixture of air and fuel from the combustion chamber to the pre-chamber, the pre-chamber formed in the head of the internal combustion engine and having a volume of up to about two cubic centimeters, the pre-chamber at least partially separated from the combustion chamber by a wall, one or more apertures formed through the wall, the wall between the pre-chamber and the combustion chamber being convex and protruding into the combustion chamber, the one or more apertures providing fluid communication paths between the combustion chamber and the pre-chamber;

igniting a mixture of the fuel and the air with a spark plug, the spark plug mounted within the pre-chamber;

efficiently combusting the air and fuel mixture within the pre-chamber and the combustion chamber; and efficiently combusting the fuel and air mixture within the combustion chamber.

13. The method of claim 12 wherein positioning an air heater in a heat transfer relationship with air in the intake duct further includes:

mounting the air heater in the intake duct, the air heater including
a heating element; and
a support structure to support the heating element; and
positioning the heating element in contact with the air in the intake duct.

14. The method of claim 13 wherein mounting the air heater in the intake duct further includes:

utilizing a heating element having a plurality of 180-degree bends and a plurality of planar portions positioned between the 180-degree bends; and utilizing the support structure to support and position the heating element in contact with the air in the intake duct, the support structure including a plurality of flange portions positioned adjacent the plurality of planar portions, wherein the plurality of planar portions are spaced apart from and positioned substantially parallel to one another.

15. The method of claim 13 wherein mounting the air heater in the intake duct further includes:

utilizing an air heater defining a cartridge, the cartridge disposed in the intake duct within the head of the internal combustion engine and adjacent to the combustion chamber, the cartridge having a portion formed of thermally conductive material that defines the heating element.

16. The method of claim 13 wherein mounting the air heater in the intake duct further includes:

mounting an intake port liner in the intake port, the intake port liner shaped to be received by the intake port and including an air passage portion allowing air to flow through the intake port liner and into the combustion chamber, at least a portion of the intake port liner defining the heating element wherein the heating element is formed of thermally conductive material.

17. The method of claim 13 wherein mounting the air heater in the intake duct further includes:

mounting the air heater in an intake manifold of the internal combustion engine, the air heater having a thermally conductive molded component.

18. The method of claim 13 wherein the step of feeding a mixture of air and fuel from the combustion chamber to the pre-chamber occurs when a piston moves towards the head of the internal combustion engine.

19. The method of claim 13 further comprising:

selectively energizing the air heater to increase a temperature of the air in the intake duct from a first temperature to a second temperature greater than the first temperature when the control module determines that the temperature of the air in the intake duct is below the threshold air temperature; and de-energizing the air heater when the control module determines that the temperature of the air in the intake duct is above the threshold air temperature, and the temperature of the internal combustion engine coolant is above the threshold coolant temperature.

20. An internal combustion engine with an intake air heater for a motor vehicle, the internal combustion engine comprising:

an engine block defining at least one cylinder, the cylinder having a longitudinal axis;

a head mounted to the internal combustion engine block and defining an axial end of the cylinder;

a piston mounted within the cylinder and sliding along the longitudinal axis within the cylinder, the piston defining, with the cylinder and the head, a combustion chamber of the internal combustion engine;

an air intake duct feeding fresh air into the combustion chamber through at least one intake port, the intake port formed through the head;

at least one intake valve disposed in the head and acting on the intake port and controlling an amount of air entering the combustion chamber;

at least one fuel injector, the fuel injector disposed in the head or air intake duct and being selectively activated to supply fuel to the combustion chamber;

at least one sensor, the sensor detecting an air temperature of the air in the intake duct, an engine coolant temperature, or a temperature and chemical composition of exhaust gasses in an exhaust duct;

an exhaust duct communicating with the combustion chamber through at least one exhaust port, the exhaust duct formed through the head and extracting exhaust gasses from the cylinder, the exhaust gasses being formed at a conclusion of a combustion reaction of the air and the fuel;

at least one exhaust valve acting on the exhaust port and controlling an amount of exhaust gasses departing the combustion chamber through the exhaust port;

a pre-chamber formed in the head, the pre-chamber at least partially separated from the combustion chamber by a wall, the wall between the pre-chamber and the combustion chamber being convex and protruding into the combustion chamber;

one or more apertures formed through the wall, the one or more apertures providing fluid communication paths from the combustion chamber to the pre-chamber and feeding a mixture of air and fuel from the combustion chamber to the pre-chamber, the pre-chamber being fed with the mixture of air and fuel present in the combustion chamber during movement of the piston towards the head;

an air heater, the air heater having a heating element, and a support structure supporting the heating element and positioning the heating element in a heat transfer relationship with the air in the intake duct;

an energizing apparatus providing electrical energy to the air heater, the air heater converting the electrical energy into thermal energy and transferring the thermal energy to the air in the intake duct to preheat the air prior to the air entering the combustion chamber; and a spark plug mounted on the head within the pre-chamber and acting inside the pre-chamber for cyclically and selectively igniting the air and fuel mixture present in the pre-chamber and for initiating the combustion reaction; and a control module in electronic communication with the air heater, the energizing apparatus, the spark plug, and the at least one sensor, the control module having a memory for storing control logic, a processor for executing the control logic, and a plurality of input/output ports for receiving data from the at least one sensor, the air heater, and the energizing apparatus, and for transmitting instructions to the air heater, the energizing apparatus, and the spark plug, and wherein the one or more apertures further define a plurality of combustion paths allowing an ignited air and fuel mixture from the pre-chamber to efficiently enter and create efficient combustion of the air and fuel mixture within the combustion chamber, and wherein the control module executes control logic for:

selectively energizing the air heater to preheat the air in the intake duct from a first temperature to a second temperature greater than the first temperature when the control module determines that the temperature of the air in the intake duct is below a threshold air temperature; and selectively de-energizing the air heater when the control module determines that the temperature of the air in the intake duct is above the threshold air temperature, and the temperature of internal combustion engine coolant is above a threshold coolant temperature, and a temperature and constituent components of the exhaust gasses are below threshold quantity values, wherein selectively energizing and de-energizing the air heater increases combustion efficiency of the combustion of the air and fuel mixture within the combustion chamber from a first combustion efficiency level to a second combustion efficiency level greater than the first combustion efficiency level.

* * * * *